United States Patent
Sheth et al.

(10) Patent No.: US 9,979,650 B1
(45) Date of Patent: May 22, 2018

(54) FORWARDING PACKETS USING A PROBABILISTIC FILTER AND A GROUPING TECHNIQUE

(71) Applicant: Juniper Networks, Inc., Sunnyvale, CA (US)

(72) Inventors: NischalKumar N. Sheth, Los Altos, CA (US); Jean-Marc Frailong, Los Altos Hills, CA (US); Paul R. Kim, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 365 days.

(21) Appl. No.: 14/672,810

(22) Filed: Mar. 30, 2015

(51) Int. Cl.
  H04L 12/28 (2006.01)
  H04L 12/745 (2013.01)
  H04L 12/749 (2013.01)
  H04L 12/743 (2013.01)
  H04L 12/66 (2006.01)

(52) U.S. Cl.
  CPC ............ H04L 45/748 (2013.01); H04L 12/66 (2013.01); H04L 45/741 (2013.01); H04L 45/7453 (2013.01)

(58) Field of Classification Search
  CPC .. H04L 45/742; H04L 45/7453; H04L 45/748
  USPC ........................................................ 370/392
  See application file for complete search history.

(56) References Cited

U.S. PATENT DOCUMENTS

| 7,031,320 | B2 | 4/2006 | Choe |
| 7,433,355 | B2 | 10/2008 | Wilson et al. |
| 7,602,785 | B2 | 10/2009 | Dharmapurikar et al. |
| 2013/0212296 | A1* | 8/2013 | Goel ................... H04L 45/7453 709/238 |
| 2014/0244779 | A1* | 8/2014 | Roitshtein ............. H04L 45/748 709/213 |
| 2016/0087936 | A1* | 3/2016 | Akyurek ............. H04L 61/2015 709/226 |

(Continued)

OTHER PUBLICATIONS

Wikipedia, "Bloom Filter," http://en.wikipedia.org/wiki/Bloom_filter, Mar. 24, 2015, 17 pages.

(Continued)

*Primary Examiner* — Brandon Renner
*Assistant Examiner* — Abdeltif Ajid
(74) *Attorney, Agent, or Firm* — Harrity & Harrity, LLP

(57) ABSTRACT

A device may receive a packet with a destination address, and may input, to a probabilistic filter, prefixes associated with the destination address. A prefix may include one or more most significant bits of the destination address. The device may identify candidate prefixes associated with a response from the probabilistic filter. The device may identify a longest candidate prefix of the candidate prefixes, and may perform a lookup to determine that a memory component includes a parent prefix that matches the longest candidate prefix. The parent prefix may be associated with a child prefixes that include the parent prefix and one or more additional bits. The device may identify a longest matching prefix, of the parent prefix and the child prefixes, that matches one or more most significant bits of the destination address and that corresponds to an output component. The device may output the packet via the output component.

20 Claims, 13 Drawing Sheets

(56) References Cited

U.S. PATENT DOCUMENTS

2016/0112254 A1* 4/2016 Levy-Abegnoli ... H04L 41/0803
709/220

OTHER PUBLICATIONS

Mill, "Bloom Filters by Example," http://billmill.org/bloomfilter-tutorial/ May 27, 2011, 4 pages.
ACM SIGCOMM 2003, "ACM SIGCOMM 2003—Data Communications Festival," http://conferences.sigcomm.org/sigcomm/2003/, Aug. 25, 2003, 3 pages.
Dharmapurikar et al., "Longest Prefix Matching Using Bloom Filters," IEEE/ACM Transactions on Networking, vol. 14, No. 2, Apr. 2006, 13 pages.
Eatherton et al., "Tree Bitmap : Hardware/Software IP Lookups with Incremental Updates," http://cseweb.ucsd.edu/~varghese/PAPERS/ccr2004.pdf, Apr. 2004, 26 pages.
Wikipedia, "IPv4 address exhaustion," http://en.wikipedia.org/wiki/IPv4_address_exhaustion, Mar. 16, 2015, 14 pages.
Turner, "Longest Prefix Matching," http://www.arl.wustl.edu~jst/cse/577/lec/lpMatch.pdf, May 15, 2013, 9 pages.
Quan et al., "TB2F: Tree Bitmap and Bloom-Filter for a Scalable and Efficient Name Lookup in Content-Centric Networking," http://telematics.poliba.it/publications/2014/QuanNetworking2014.pdf, Jun. 3, 2014, 9 pages.
Wikipedia, "Subnetwork," http://en.wikipedia.org/wiki/Subnetwork, Mar. 9, 2015, 9 pages.
Wikipedia, "Trie," http://en.wikipedia.org/wiki/Trie, Feb. 21, 2015, 8 pages.

* cited by examiner

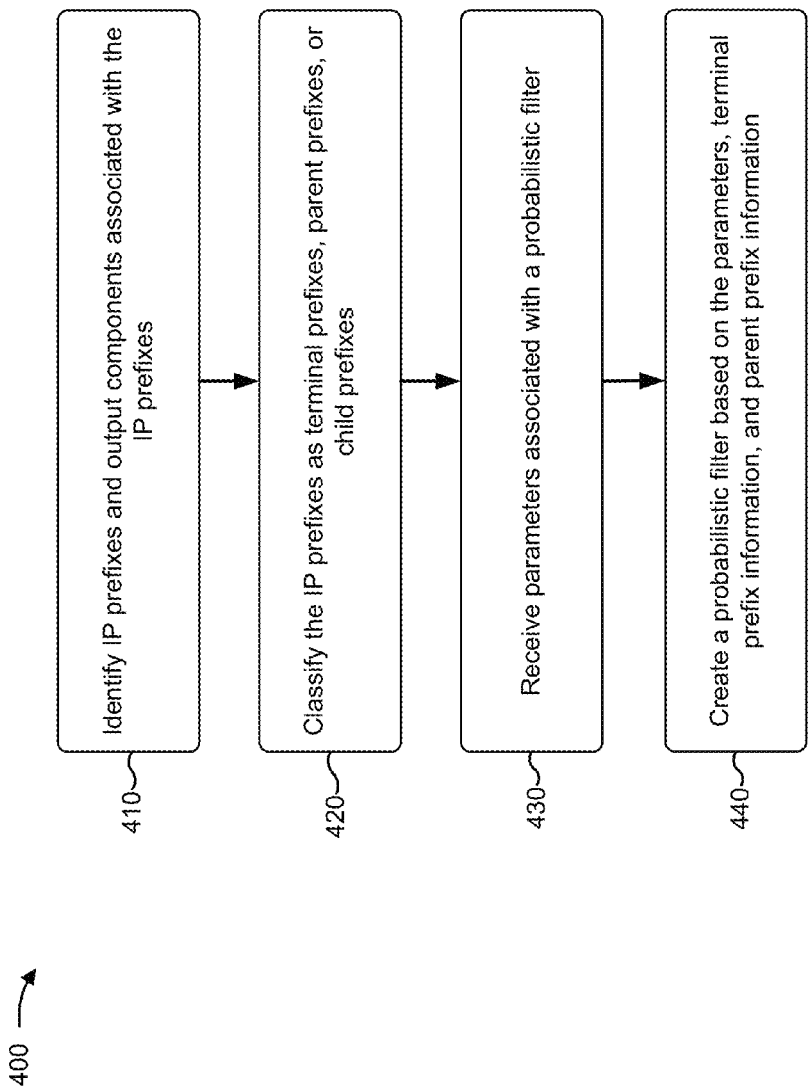

US 9,979,650 B1

FORWARDING PACKETS USING A PROBABILISTIC FILTER AND A GROUPING TECHNIQUE

BACKGROUND

A network device, included in a network, may send one or more packets to another network device. A packet may include a communication structure for communicating information, such as a protocol data unit (PDU), a packet, a frame, a datagram, a segment, a message, a block, a cell, a subframe, a slot, a symbol, a portion of any of the above, and/or another type of formatted or unformatted unit of data capable of being transmitted via a network.

SUMMARY

A device may receive a packet associated with a destination address. The device may input, to a probabilistic filter, a set of prefixes associated with the destination address. A prefix, of the set of prefixes, may include one or more most significant bits of the destination address. The device may identify a set of candidate prefixes, of the set of prefixes, associated with a particular response from the probabilistic filter. The device may identify a longest candidate prefix of the set of candidate prefixes, and may perform a lookup to determine that a memory component includes a parent prefix that matches the longest candidate prefix. The parent prefix may be associated with a set of child prefixes that include the parent prefix and one or more additional bits. The device may identify a longest matching prefix, of the parent prefix and the set of child prefixes, that matches one or more most significant bits of the destination address and that corresponds to an output component. The device may output the packet via the output component.

A computer-readable medium may include one or more instructions that, when executed by one or more processors, cause the one or more processors to receive a packet associated with a destination address. The one or more instructions may cause the one or more processors to identify, using a probabilistic filter, a set of candidate prefixes of the destination address. The one or more instructions may cause the one or more processors to identify a longest candidate prefix of the set of candidate prefixes. The one or more instructions may cause the one or more processors to determine whether a memory component includes a stored prefix that matches the longest candidate prefix. The stored prefix may be a parent prefix, of a set of parent prefixes, or a terminal prefix of a set of terminal prefixes. The parent prefix may be associated with a set of child prefixes that include the parent prefix and one or more additional bits. The terminal prefix may not be associated with any child prefixes. The one or more instructions may cause the one or more processors to selectively perform a first action or a second action based on determining whether the memory component includes the stored prefix that matches the longest candidate prefix. The first action may include removing the longest candidate prefix from the set of candidate prefixes when the memory component does not include the stored prefix. The second action may include forwarding the packet to an output component associated with the stored prefix when the memory component includes the stored prefix.

A method may include receiving, by a device, a packet associated with a destination address. The method may include inputting, by the device and to a probabilistic filter, a set of prefixes. A prefix, of the set of prefixes, may include one or more bits of the destination address. The method may include identifying, by the device, a set of candidate prefixes, of the set of prefixes, associated with a particular response from the probabilistic filter. The method may include identifying, by the device, a longest candidate prefix of the set of candidate prefixes. The method may include performing, by the device, a lookup to determine that a memory component includes a parent prefix that matches the longest candidate prefix. The parent prefix may be associated with a set of child prefixes that include the parent prefix and one or more additional bits. The method may include identifying, by the device, a longest matching prefix, of the parent prefix and the set of child prefixes, that is associated with the destination address and that corresponds to an output component. The method may include outputting, by the device, the packet via the output component.

BRIEF DESCRIPTION OF THE DRAWINGS

FIG. 4 is a flow chart of an example process for creating a probabilistic filter to be used for forwarding packets;

DETAILED DESCRIPTION

Figure 1A:
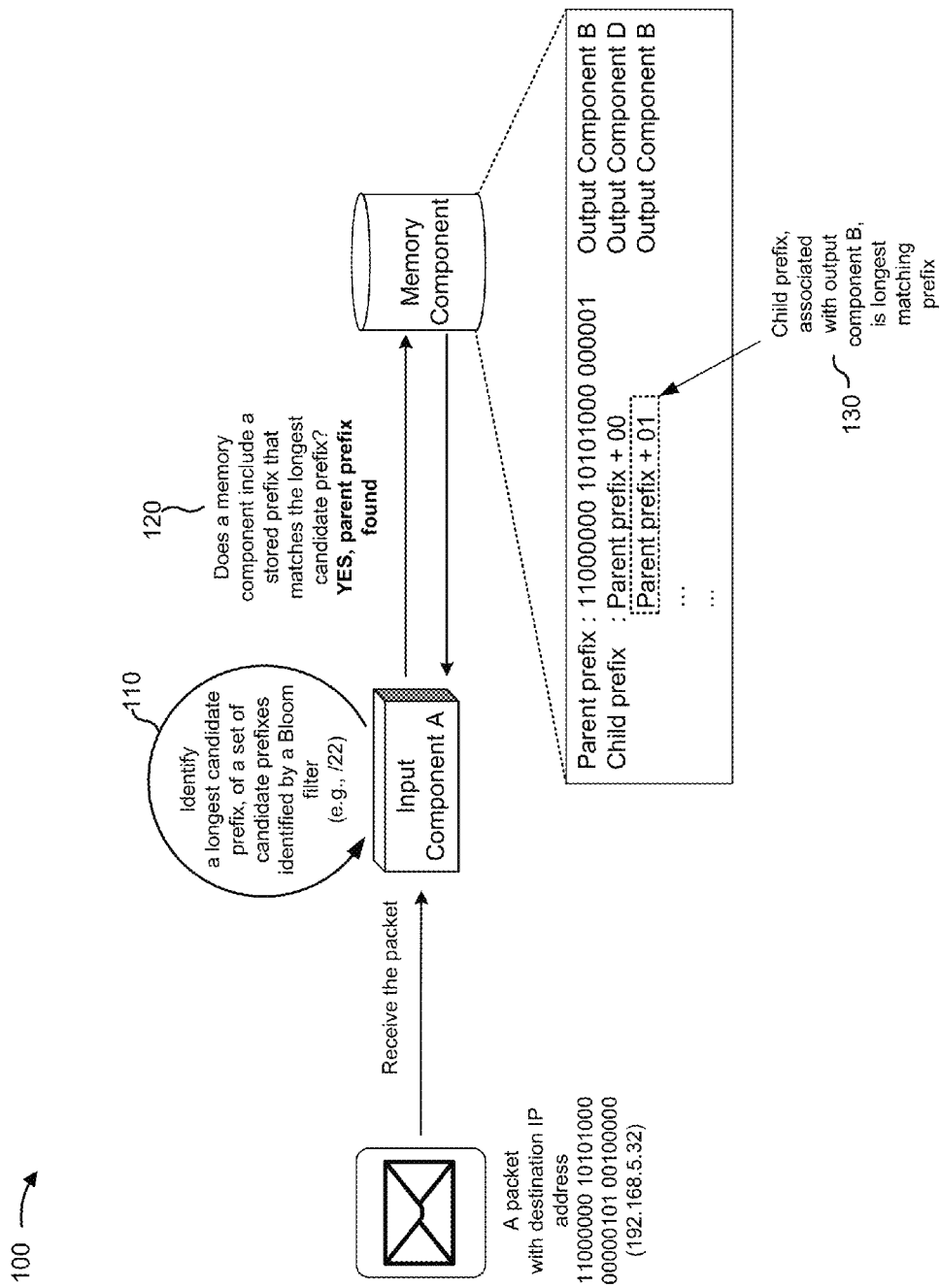
FIGS. 1A and 1B are diagrams of an overview of an example implementation described herein.

The following detailed description of example implementations refers to the accompanying drawings. The same reference numbers in different drawings may identify the same or similar elements.

A network device (e.g., a router, a switch, a gateway, or the like) may include an input component for receiving packets and an output component for outputting packets. A destination Internet Protocol (IP) address, used by the network device to route or forward packets, may include an IP prefix and a host identifier. The IP prefix may include some quantity of the most significant bits of the destination IP address, and may identify a destination subnetwork to which a packet is to be forwarded. The network device may store (e.g., using the input component) IP prefixes in association with information that identifies output components to be used to output packets associated with the IP prefixes.

The network device may receive, via the input component, a packet associated with a destination IP address. The network device may determine which stored IP prefix is a longest matching prefix for the packet's destination IP address. The longest matching prefix may refer to a stored IP prefix that matches a largest quantity of most significant bits of the packet's destination IP address. The network device may output the packet via an output component associated with the longest matching prefix. But, because of physical or spatial constraints, the network device may have a limited capacity to store (e.g., in the input component) IP prefixes in association with information that identifies output components. Due to this limited capacity, the network device may not be able to use a large quantity of IP prefixes (e.g., millions or more) for packet forwarding. With a predicted upcoming exhaustion of the internet protocol version 4 (IPv4) address space, the network device may need the capability to use a large quantity of IP prefixes for packet forwarding.

In order to enable the network device to use a larger quantity of IP prefixes, the network device may use a probabilistic filter (e.g., a Bloom filter), which may be stored by the input component, and may use a memory component that groups IP prefixes in association with information that identifies output components. To determine a longest matching prefix, the network device may perform a lookup, using the memory component, based on a particular response from the Bloom filter (e.g., a space-efficient probabilistic filter that permits the network device to search for fewer IP prefixes). But, because of physical or spatial constraints, a quantity of IP prefixes that may be stored by a Bloom filter (e.g., in the input component) may be limited (e.g., an input component may not have space to store a Bloom filter that stores one million IP prefixes, two million IP prefixes, or the like). Implementations described herein may include a network device that forwards packets using a probabilistic filter that stores IP prefixes that are organized using a grouping technique. Implementations described herein may increase a quantity of IP prefixes that may be used by the network device for packet forwarding without an increase in memory requirements of the input component and with only a small increase (one extra lookup per packet, or the like) in a quantity of lookups of the memory component.

Figure 1B:
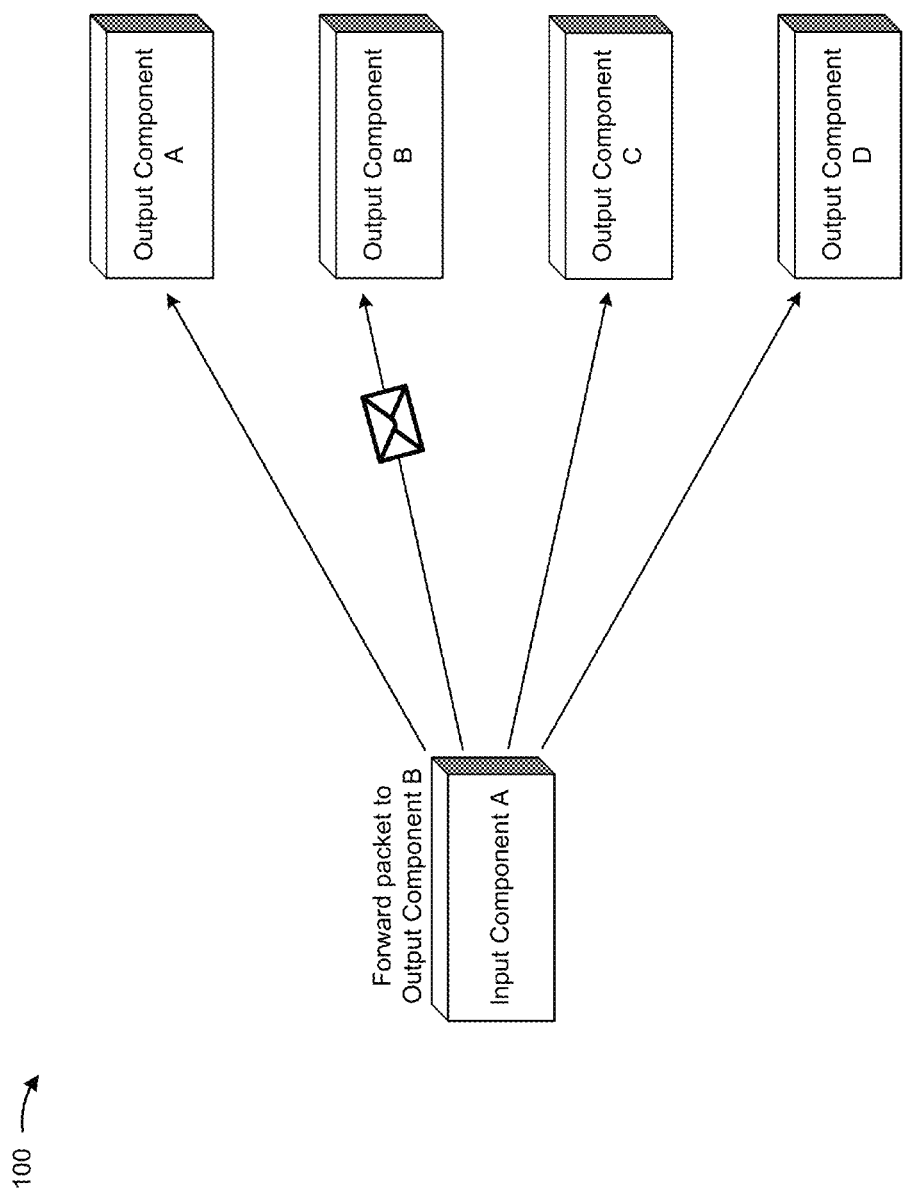

FIGS. 1A and 1B are diagrams of an overview of an example implementation 100 described herein. Assume that implementation 100 includes a network device that includes input components, output components, and a memory component. Assume that the network device has received IP prefixes and information that identifies output components associated with the IP prefixes. Assume further that the network device has classified the IP prefixes into one of three types of prefixes: a terminal prefix corresponding to an output component and not associated with a child prefix (e.g., a prefix "110" associated with output component A), a parent prefix associated with a set of child prefixes that correspond to a set of output components, or a child prefix that includes the bits of the parent prefix plus one or more additional bits (e.g., a parent prefix may be "101," and child prefixes associated with the parent prefix may be "1010" (101+0), and "10110" (101+10)). Assume further that the network device has stored, in the memory component, terminal prefix information that identifies a set of terminal prefixes, parent prefix information that identifies a set of parent prefixes, child prefix information that identifies a set of child prefixes, and information that identifies output components associated with one or more of the stored prefixes.

Assume further that an input component, included in the network device, stores a probabilistic filter, such as a Bloom filter. A Bloom filter may test whether an element is a member of a set (e.g., sometimes referred to herein as a filter set). For example, the network device may use the Bloom filter to determine whether a prefix is possibly a member of a filter set (e.g., a positive response) or is definitely not a member of the filter set (e.g., a negative response). In other words, with a Bloom filter, false positives are possible, and false negatives are not possible. The filter set may include the terminal prefix information and the parent prefix information, but may not include the child prefix information, thereby reducing the size of the filter set.

As shown in FIG. 1A, assume that input component A receives a packet associated with the following 32-bit destination IP address: 11000000 10101000 00000101 00100000 (e.g., 192.168.5.32 in dot decimal notation). The network device may identify a set of prefixes included in the destination IP address. A prefix may include one or more most significant bits of the destination IP address (e.g., the set of prefixes may include a prefix that is identical to the destination IP address, a prefix that includes the 31 most significant bits of the destination IP address, a prefix that includes the 30 most significant bits of the destination IP address, and so on). The network device may input the set of prefixes into the Bloom filter to identify a set of candidate prefixes, which may refer to the prefixes for which the Bloom filter gives a positive response. As an example, assume that the set of candidate prefixes includes a candidate prefix of length /22, which may refer to a candidate prefix that includes the 22 most significant bits of the destination IP address; a candidate prefix of length /19, which may refer to a candidate prefix that includes the 19 most significant bits of the destination IP address; or the like.

As shown by reference number 110, the network device may identify the candidate prefix of length /22 as a longest candidate prefix of the set of candidate prefixes. As shown by reference number 120, the network device may determine whether the memory component includes a stored prefix that matches the longest candidate prefix and may determine whether the stored prefix is a parent prefix or a terminal prefix. As shown, assume that the network device performs a lookup in the memory component and determines that the memory component includes a parent prefix that matches the longest candidate prefix.

As shown by reference number 130, the network device identifies a longest matching prefix of the parent prefix and associated child prefixes. The longest matching prefix may refer to a prefix that matches a largest quantity of most significant bits of the destination IP address (e.g., without including any bits that do not match the destination IP address). As shown, the network device may perform a lookup in the memory component to determine that a child prefix that is a concatenation of the parent prefix (e.g., 11000000 10101000 000001) and "01" is the longest matching prefix and that the child prefix corresponds to output component B of the network device.

As shown in FIG. 1B, based on the lookup, the network device may forward the packet from input component A to output component B. In this way, the network device may use the Bloom filter and the grouping technique (e.g., to group a set of child prefixes with a parent prefix) to conserve more memory than if all IP prefixes had to be stored in the Bloom filter (e.g., in implementation 100, the filter set includes the set of terminal prefixes and the set of parent prefixes, while the set of child prefixes need not be added to the filter set). In this way, a larger quantity (e.g., 10 million, 100 million, or the like) of IP prefixes may be used by the network device for packet forwarding without increasing the quantity of IP prefixes stored by the Bloom filter and with only a small increase in a quantity of lookups of the memory component (e.g., one additional lookup, two additional lookups, etc.).

Figure 2:
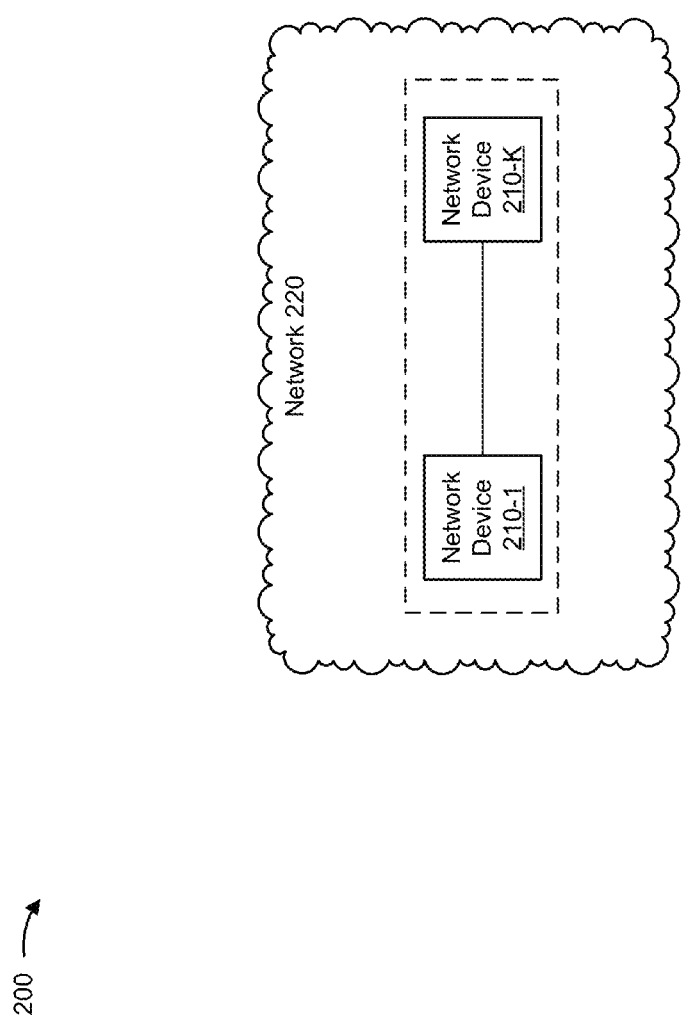
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210-1 through 210-K (K≥1) (hereinafter referred to collectively as "network devices 210," and individually as "network device 210") and a network 220. Devices of environment 200 may interconnect via wired connections, wireless connections, or a combination of wired and wireless connections.

Network device 210 may include one or more devices (e.g., one or more traffic transfer devices) capable of processing and/or transferring packets between endpoint devices. For example, network device 210 may include a router, a firewall, a gateway, a switch, a hub, a bridge, a reverse proxy, a server (e.g., a proxy server), a security device, an intrusion detection device, a load balancer, or a similar device. In some implementations, network device 210 includes one or more processors implemented in hardware, firmware, or a combination of hardware and software. The one or more processors may include a processor (e.g., a central processing unit (CPU), a graphics processing unit (GPU), an accelerated processing unit (APU), etc.), a microprocessor, and/or any processing component that interprets and/or executes instructions. In some implementations, network device 210 may be connected to and/or may be in communication with one or more other network devices 210. In some implementations, network device 210 may communicate with other devices (not shown) in order to process and/or route packets received by network device 210.

In some implementations, network device 210 may forward a packet to a particular output component of network device 210 using a probabilistic filter and a grouping technique. In some implementations, network device 210 may apply the grouping technique by classifying destination address prefixes as terminal prefixes, parent prefixes, or child prefixes. In some implementations, network device 210 may perform a lookup in a memory component to determine an output component to which a packet is to be forwarded.

Network 220 may include one or more wired and/or wireless networks. For example, network 220 may include a private network, an ad hoc network, an intranet, the Internet, a fiber optic-based network, a cloud computing network, a cellular network, a public land mobile network (PLMN), a local area network (LAN), a wide area network (WAN), a metropolitan area network (MAN), a telephone network (e.g., the Public Switched Telephone Network (PSTN)), and/or a combination of these or other networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
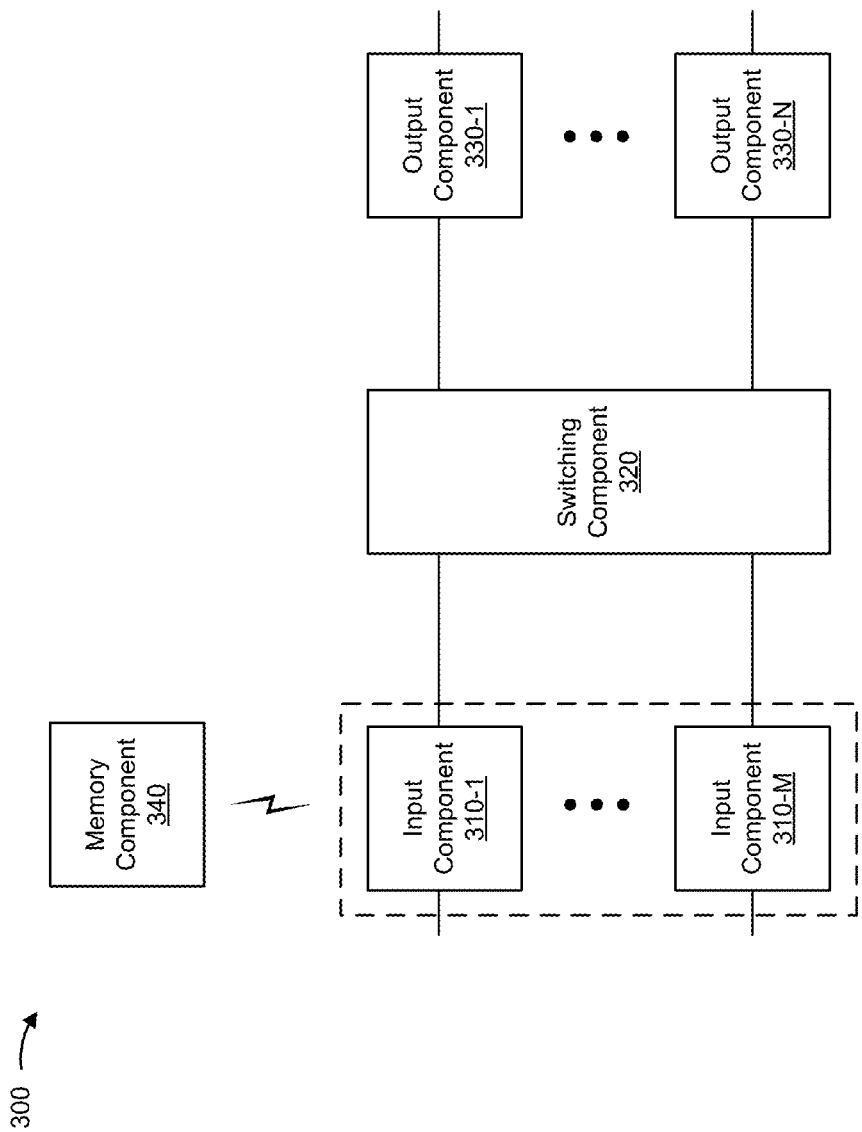
FIG. 3 is a diagram of example components of one or more devices of FIG. 2.

FIG. 3 is a diagram of example components of a device 300. Device 300 may correspond to network device 210. In some implementations, network device 210 may include one or more devices 300 and/or one or more components of device 300. As shown in FIG. 3, device 300 may include one or more input components 310-1 through 310-M (M≥1) (hereinafter referred to collectively as "input components 310," and individually as "input component 310"), a switching component 320, one or more output components 330-1 through 330-N(N≥1) (hereinafter referred to collectively as "output components 330," and individually as "output component 330"), and a memory component 340.

Input component 310 may include one or more components capable of receiving, processing, and/or forwarding packets. Input component 310 may process incoming packets, such as by performing data link layer encapsulation or decapsulation. In some implementations, input component 310 may include an input line card that includes one or more packet processing components (e.g., in the form of integrated circuits), such as one or more interface cards (IFCs), packet forwarding components, line card controller components, input ports, processors, memories, and/or input queues. In some implementations, input component 310 may store and/or utilize a probabilistic filter, such as a Bloom filter (e.g., input component 310 may store information, associated with the probabilistic filter, that permits the probabilistic filter to be applied). Additionally, or alternatively, network device 210 may forward a packet from input component 310 to output component 330 based on performing a lookup in memory component 340 (e.g., to determine an output component 330 to which a packet is to be forwarded).

Switching component 320 may interconnect input components 310 and output components 330. In some implementations, switching component 320 may be implemented via one or more crossbars, busses, memories, or the like. In some implementations, switching component 320 may enable communication between input components 310 and output components 330.

Output component 330 may include one or more components capable of receiving, processing, and/or forwarding packets. Output component 330 may process outgoing packets, such as by performing data link layer encapsulation or decapsulation. In some implementations, output component 330 may include an output line card that includes one or more packet processing components (e.g., in the form of integrated circuits), such as one or more interface cards (IFCs), packet forwarding components, line card controller components, output ports, processors, memories, and/or output queues. Network device 210 may output packets via output component 330.

Memory component 340 may include one or more components (e.g., a memory, a processor, etc.) capable of receiving, storing, processing, and/or providing information associated with packet forwarding. Memory component 340 may include a random access memory (RAM), a read only memory (ROM), and/or another type of dynamic or static storage device (e.g., a flash memory, a magnetic memory, an optical memory, etc.) that stores information and/or instructions. In some implementations, memory component 340 may be local to input component 310. In some implementations, memory component 340 may be remote from input component 310. In some implementations, memory component 340 may receive and/or store terminal prefix information, parent prefix information, and/or child prefix information to be used for forwarding packets. Additionally, or alternatively, memory component 340 may provide, to a probabilistic filter stored by input component 310, terminal prefix information and/or parent prefix information to be used for forwarding packets.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for creating a probabilistic filter to be used for forwarding packets. In some implementations, one or more process blocks of FIG. 4 may be performed by network device 210 and/or one or more components of network device 210.

As shown in FIG. 4, process 400 may include identifying IP prefixes and output components associated with the IP prefixes (block 410). For example, network device 210 may identify IP prefixes and output components 330 associated with the IP prefixes. An output component 330 associated with an IP prefix may be used to output a packet that includes the IP prefix as part of the packet's designation IP address. In some implementations, network device 210 may identify the IP prefixes in association with output components 330 based on a routing protocol. Additionally, or alternatively, network device 210 may identify the IP prefixes in association with output components 330 based on receiving information from an input device (e.g., that receives input from a network administrator), based on receiving information from another device (e.g., another network device 210), or the like. In some implementations, network device 210 may identify the IP prefixes based on a network topology, a routing protocol, or the like.

In some implementations, the IP prefixes may be a part of a destination address that conforms to a particular protocol, such as Internet Protocol version 4 (IPv4), Internet Protocol version 6 (IPv6), or some other communication protocol.

As further shown in FIG. 4, process 400 may include classifying the IP prefixes as terminal prefixes, parent prefixes, or child prefixes (block 420). For example, network device 210 may classify one or more IP prefixes into one of three types of prefixes: a terminal prefix not associated with a child prefix, a parent prefix associated with a set of child prefixes, or a child prefix, which is a concatenation of a parent prefix and one or more additional bits included in the child prefix. In some implementations, input component 310 may store terminal prefix information and/or parent prefix information. A quantity of terminal prefixes and parent prefixes may be limited because input component 310 may have a limited amount of memory. Thus, in some implementations, network device 210 may determine a maximum quantity of prefixes (e.g., terminal prefixes and/or parent prefixes) and/or a maximum quantity of bits that can be stored by a memory of input component(s) 310, and may classify the IP prefixes based on the maximum quantity of prefixes and/or the maximum quantity of bits.

In some implementations, network device 210 may classify a nominal IP prefix that does not correspond to an IP prefix associated with an output component 330. Network device 210 may classify a nominal IP prefix as a parent prefix in order to form more efficient groupings of non-nominal child prefixes that correspond to IP prefixes associated with output component(s) 330. For example, if "1010" (101+0) and "1011" (101+1) are non-nominal child prefixes, network device 210 may classify "101" as a nominal parent prefix even if the IP prefix "101" does not correspond to an output component 330. Thus, network device 210 may store nominal parent prefixes that do not have a direct association with an output component 330, but child prefixes of the nominal parent prefix may be associated with one or more output components 330.

Additionally, or alternatively, child prefix may include a mathematically possible prefix that is formed based on a parent prefix, but that does not correspond to an output component 330. In other words, some child prefixes may be associated with an output component 330, and some child prefixes may not be associated with an output component 330. For example, if the prefix "10001" corresponds to an output component 330 and the prefix "10000" does not correspond to an output component 330, network device 210 may classify "1000" as a parent prefix, may classify "10001" (1000+1) as a child prefix, and may classify "10000" (1000+0) as a child prefix even though "10000" does not correspond to an output component 330. In some implementations, mathematically possible child prefixes may be created as a part of using a bitmap to relate a set of child prefixes to a parent prefix.

In some implementations, network device 210 may store, in memory component 340, terminal prefix information that identifies a set of terminal prefixes, parent prefix information that identifies a set of parent prefixes, and child prefix information that identifies a set of child prefixes. Additionally, or alternatively, network device 210 may store (e.g., in a data structure, in memory component 340, etc.) information that identifies an output component 330 associated with a terminal prefix, may store information that identifies an output component 330 associated with a parent prefix, may store information that identifies an output component 330 associated with a child prefix, may store information that identifies a set of child prefixes associated with a parent prefix, or the like. In some implementations, network device 210 may store, in memory component 340, a set of child prefixes associated with a parent prefix in a manner that allows network device 210 to perform a lookup in memory component 340 using a bitmap, as described in more detail elsewhere herein.

In some implementations, network device 210 may classify the IP prefixes based on a capacity of a probabilistic filter stored by input component 310, based on patterns of clusters within the IP prefixes, based on patterns of network traffic received by network device 210, or the like. For example, a sum of a quantity of terminal prefixes and a quantity of parent prefixes may be below a threshold sum dictated by the capacity of the probabilistic filter, which has physical and spatial constraints (e.g., if the capacity of the probabilistic filter is 4 million prefixes, and there exist 10 million IP prefixes, network device 210 may classify at least 6 million IP prefixes as child prefixes, which may not be stored by the probabilistic filter, and which may be stored by memory component 340).

As another example, a large quantity (e.g., greater than a threshold) of IP prefixes with common most significant bits may be classified by network device 210 as child prefixes associated with a parent prefix corresponding to the common most significant bits. For example, if 153.12.140.0 /24 (10011001 00001100 10001100) is the only IP prefix that has these 24 most significant bits, network device 210 may classify 153.12.140.0 /24 as a terminal prefix. If 153.12.150.0 /22 is an IP prefix and there exists a quantity (above a threshold) of other IP prefixes of /23, /24, /25, and /26 lengths which start with 153.12.150.0 /22, network device may classify 153.12.150.0 /22 as a parent prefix and the other IP prefixes of /23, /24, /25, and /26 lengths as child prefixes associated with the parent prefix. Binary notation and dot decimal notation are sometimes used interchangeably herein (e.g., for example, 153.12.150.0 /22 may be used to refer to a prefix of 10011001 00001100 100101).

As another example, if an IP prefix is frequently (e.g., as compared to a threshold) a longest matching prefix for packets received by network device 210, network device 210 may classify the IP prefix as a terminal prefix to reduce a quantity of lookups of memory component 340 when such packets are received by network device 210.

As further shown in FIG. 4, process 400 may include receiving parameters associated with a probabilistic filter (block 430). For example, network device 210 may receive parameters associated with a probabilistic filter, such as a Bloom filter. In some implementations, network device 210 may receive the parameters from another device in communication with network 220 (e.g., an input device being used by a network administrator, another network device 210, etc.). In some implementations, the parameters may include information associated with one or more hash functions of the Bloom filter, information associated with a size of a bit vector of the Bloom filter, or the like.

A Bloom filter may determine, rapidly and memory-efficiently (e.g., within a particular number of clock cycles), whether a prefix is a member of a set of prefixes pre-stored on the Bloom filter (e.g., a set of prefixes included in a filter set). The probabilistic nature of the Bloom filter may mean that the Bloom filter, for a particular prefix, may return a response of "definitely not in filter set" (e.g., a negative response) or "may be in filter set" (e.g., a positive response). That is, false positives may be possible but false negatives may not be possible. Additionally, or alternatively, the Bloom filter's base data structure may be a bit vector, which is a set of bits initially set to zero (e.g., the bits may be capable of a value of zero or one). Additionally, or alternatively, as a prefix is stored by the Bloom filter (e.g., added to the filter set), the Bloom filter may use one or more hash functions to hash one or more bits, of the bit vector, to a value of one. As more prefixes are added to the filter set, the Bloom filter may use the one or more hash functions to hash one or more bits, of the bit vector, to a value of one. In some implementations, a base bit vector may be a bit vector of all zeroes.

In some implementations, when a prefix is input to a Bloom filter to test whether the prefix is a member of the filter set, the Bloom filter may hash one or more bits of the bit vector based on the prefix and using the one or more hash functions. If the only bits hashed to one based on the prefix are bits that had been hashed to one based on the prefixes of the filter set, the Bloom filter may provide a positive response for the prefix. If one or more bits, which had not been hashed to one based on the prefixes of the filter set, are hashed to one based on the prefix, the Bloom filter may provide a negative response for the prefix.

As further shown in FIG. 4, process 400 may include creating a probabilistic filter based on the parameters, terminal prefix information, and parent prefix information (block 440). For example, network device 210 may create a probabilistic filter, such as a Bloom filter, based on the parameters, terminal prefix information, and parent prefix information. In some implementations, network device 210 may create the Bloom filter based on the parameters (e.g., may set up a bit vector of the Bloom filter based on the parameters, which may include a size of the bit vector). Additionally, or alternatively, network device 210 may store the Bloom filter in input component 310. Additionally, or alternatively, network device 210 may store, in the Bloom filter, terminal prefix information, that identifies a set of terminal prefixes, and parent prefix information that identifies a set of parent prefixes (e.g., network device 210 may add the set of terminal prefixes and the set of parent prefixes to a filter set of the Bloom filter).

In some implementations, as network device 210 stores a terminal prefix in the Bloom filter, the Bloom filter may use one or more hash functions to hash one or more bits, of the Bloom filter's bit vector, to a value of one. Additionally, or alternatively, as network device 210 stores a parent prefix in the Bloom filter, the Bloom filter may use the one or more hash functions to hash one or more bits to a value of one. Once the bit vector has been initialized using the terminal prefixes and the parent prefixes included in the filter set, the Bloom filter may be used by network device 210 during packet forwarding, as described below in connection with FIG. 6 (e.g., network device 210 may use the Bloom filter to rule out prefixes that do not match a parent prefix or a terminal prefix).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
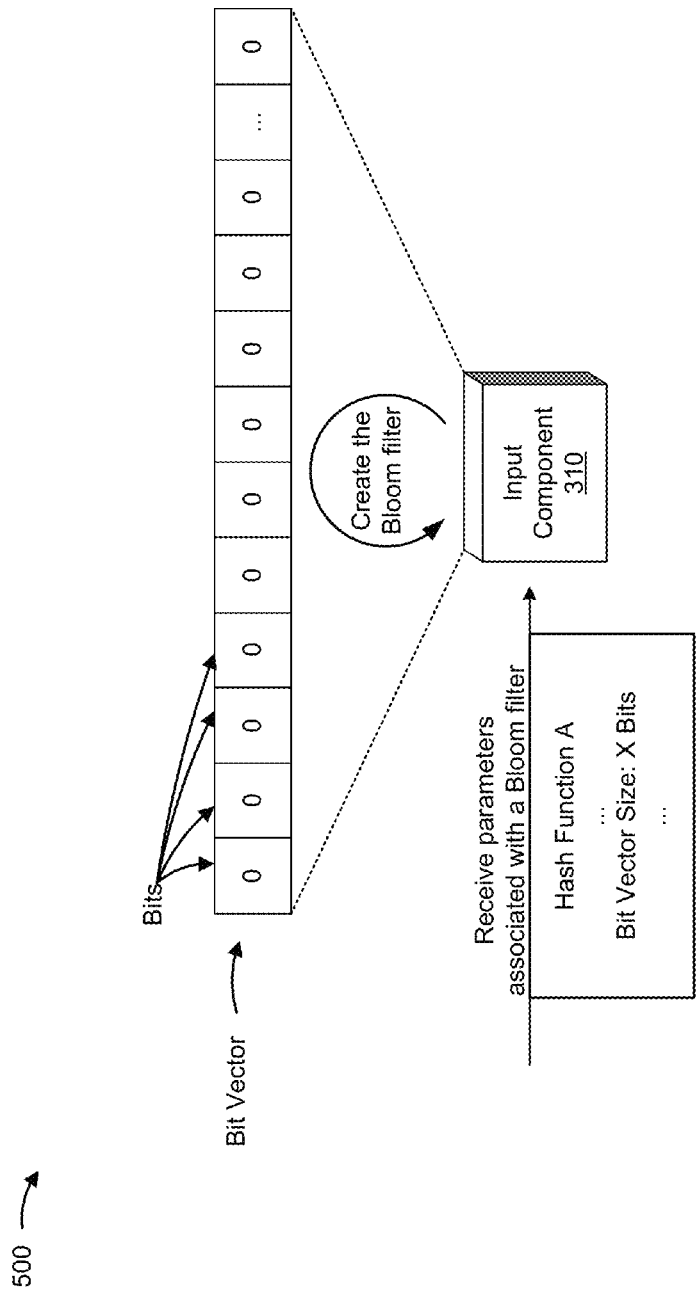
FIGS. 5A and 5B are diagrams of an example implementation relating to the example process shown in FIG. 4.
Figure 5B:
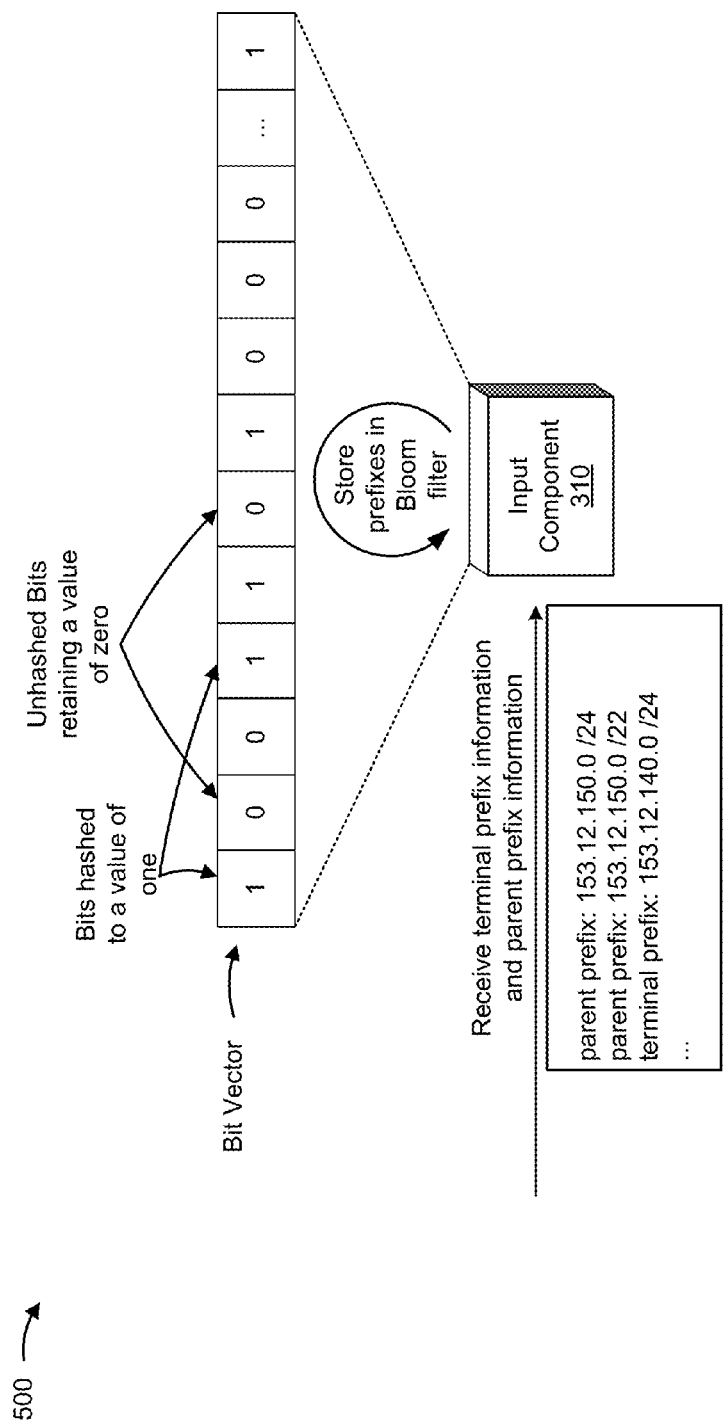

FIGS. 5A and 5B are diagrams of an example implementation 500 relating to example process 400 shown in FIG. 4. FIGS. 5A and 5B show an example of creating a probabilistic filter to be used for forwarding packets.

As shown in FIGS. 5A and 5B, assume that implementation 500 includes network device 210, which includes input component 310 and memory component 340. Assume that network device 210 has identified IP prefixes and output components associated with the IP prefixes. Assume further that network device 210 has classified the IP prefixes as terminal prefixes, parent prefixes, or child prefixes. Assume further that network device 210 has stored terminal prefix information and parent prefix information in memory component 340.

As shown in FIG. 5A, network device 210, receives parameters associated with a Bloom filter. The parameters include information that identifies a hash function for the Bloom filter (e.g., shown as "Hash Function A") and information associated with the size of a bit vector of the Bloom filter (e.g., shown as "Bit Vector Size: X Bits"). As shown, network device 210 creates the Bloom filter based on the parameters. The bits of the bit vector are initially set to zero. Assume that network device 210 stores the Bloom filter using one or more input components 310 (e.g., in a memory component local to input components 310 and/or accessible by input components 310).

As shown in FIG. 5B, input component 310 receives (e.g., from memory component 340, which may be remote from input component(s) 310) terminal prefix information that identifies a set of terminal prefixes and parent prefix information that identifies a set of parent prefixes. As further shown, network device 210 stores the terminal prefix information and the parent prefix information using the Bloom filter stored by input component 310 (e.g., adds the terminal prefix information and the parent prefix information to a filter set of the Bloom filter). As shown, the parent prefix information includes "parent prefix: 153.12.150.0 /24," "153.12.150.0/22," etc. As further shown, the terminal prefix information includes "terminal prefix: 153.12.140.0 /24," etc. As network device 210 stores a parent prefix "153.12.150.0 /24" in the Bloom filter, the Bloom filter may use the hash function to hash one or more bits of the bit vector to a value of one (e.g., the first and fourth bit, counting from the left, may be hashed to one based on the parent prefix "153.12.150.0 /24"). As network device 210 stores a parent prefix "153.12.150.0/22" in the Bloom filter, the Bloom filter may use the hash function to hash one or more bits of the bit vector to a value of one (e.g., the parent prefix may correspond to hashing the fourth and fifth bit, but since the fourth bit has already been hashed to one, the Bloom filter need only hash the fifth bit to one).

In a similar manner, the Bloom filter may hash one or more bits of the bit vector based on other prefixes included in the set of terminal prefixes and the set of parent prefixes. In this way, network device 210 may create a Bloom filter that may be used during packet forwarding (e.g., to determine whether a prefix possibly matches a terminal prefix or a parent prefix (e.g., a positive response) or definitely does not match a terminal prefix or a parent prefix (e.g., a negative response)).

As indicated above, FIGS. 5A and 5B are provided merely as an example. Other examples are possible and may differ from what was described with regard to FIGS. 5A and 5B.

Figure 6:
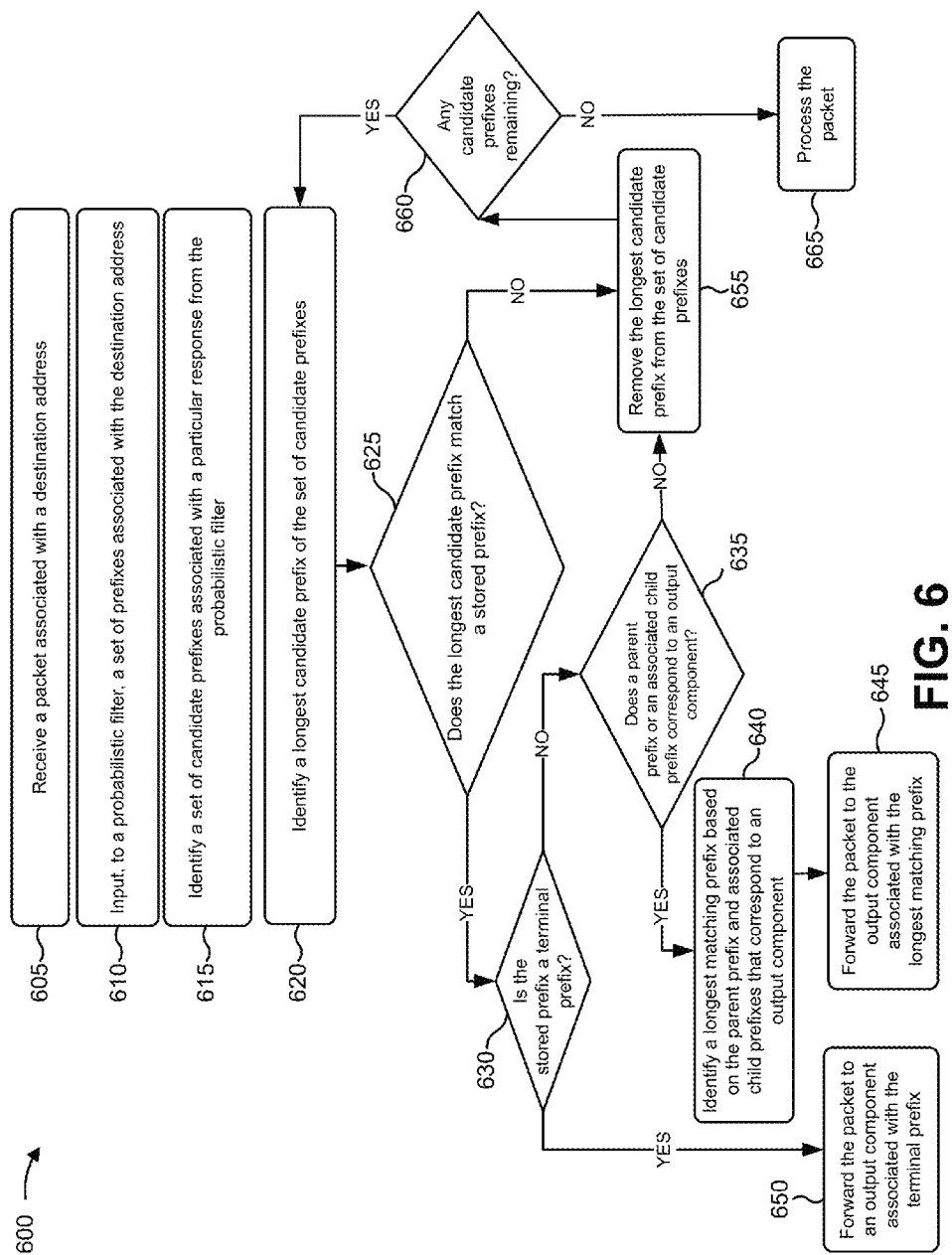
FIG. 6 is a flow chart of an example process for forwarding a packet using a probabilistic filter and a grouping technique.

FIG. 6 is a flow chart of an example process 600 for forwarding a packet using a probabilistic filter and a grouping technique. In some implementations, one or more process blocks of FIG. 6 may be performed by network device 210 and/or one or more components of network device 210.

As shown in FIG. 6, process 600 may include receiving a packet associated with a destination address (block 605). For example, network device 210 may receive, via input component 310, a packet and may read a packet header of the packet to determine a destination address. In some implementations, the destination address may conform to a particular protocol, such as Internet Protocol version 4 (IPv4), Internet Protocol version 6 (IPv6), or the like. For example, network device 210 may determine that the destination address is an IP address of 63.88.4.168 (e.g., 00111111 01011000 00000100 10101000).

As further shown in FIG. 6, process 600 may include inputting, to a probabilistic filter, a set of prefixes associated with the destination address (block 610). For example, network device 210 may input, to a probabilistic filter (e.g., a Bloom filter), a set of prefixes associated with the destination address. In some implementations, a prefix may include one or more most significant bits of the destination address. In some implementations, the probabilistic filter may be stored by input component 310 of network device 210. For example, assume that the destination address is 63.88.4.168. A set of prefixes associated with the destination address may include prefixes, such as 63.88.4.168 /32, 63.88.4.168 /31, 63.88.4.168 /30, 63.88.4.168 /29, and so on.

As further shown in FIG. 6, process 600 may include identifying a set of candidate prefixes associated with a particular response from the probabilistic filter (block 615). For example, network device 210 may identify, using the probabilistic filter, a set of candidate prefixes, of the set of prefixes associated with the destination address, that may be included in a filter set (e.g., the filter set may include a set of parent prefixes and/or a set of terminal prefixes). For example, network device 210 may identify 63.88.4.168 /24, 63.88.4.168 /21, 63.88.4.168 /19 and 63.88.4.168 /13 as candidate prefixes included in the set of candidate prefixes (e.g., the Bloom filter returned a particular response (e.g., a positive response of "may be in filter set") for these candidate prefixes).

In some implementations, if network device 210 determines that there are no candidate prefixes (e.g., the set of candidate prefixes is empty because the Bloom filter returned a negative response for all prefixes associated with the destination address), network device 210 may route the packet using a pre-configured default route.

As further shown in FIG. 6, process 600 may include identifying a longest candidate prefix of the set of candidate prefixes (block 620). For example, network device 210 may identify the longest candidate prefix of the set of candidate prefixes. The longest candidate prefix may be a candidate prefix with the greatest quantity of bits as compared to other candidate prefixes in the set of candidate prefixes. For example, if the set of candidate prefixes includes 63.88.4.168 /24 and 63.88.4.168 /21, network device 210 may identify 63.88.4.168 /24 (00111111 01011000 00000100) as the longest candidate prefix.

As further shown in FIG. 6, process 600 may include determining whether the longest candidate prefix matches a stored prefix (block 625). For example, network device 210 may determine whether memory component 340 stores a stored prefix (e.g., a terminal prefix or a parent prefix) that matches the longest candidate prefix. In some implementations, network device 210 may perform a lookup using memory component 340 to determine whether a stored prefix matches the longest candidate prefix.

As further shown in FIG. 6, if the longest candidate prefix matches a stored prefix (block 625—YES), then process 600 may include determining whether the stored prefix is a terminal prefix (block 630). For example, network device 210 may determine whether the stored prefix is a terminal prefix (e.g., a prefix not associated with child prefixes) or a parent prefix (e.g., a prefix associated with one or more child prefixes). In some implementations, network device 210 may determine whether the stored prefix is a terminal prefix based on performing a lookup in memory component 340 (e.g., the same lookup as the lookup performed in connection with block 625, or a different lookup). Network device 210 may store a data structure that includes information that identifies a classification of stored prefixes. For example, a stored prefix may be classified as a terminal prefix (e.g., associated with a terminal prefix indicator), may be classified as a parent prefix (e.g., associated with a parent prefix indicator), or may be classified as a child prefix (e.g., associated with a child prefix indicator).

As further shown in FIG. 6, if the stored prefix is not a terminal prefix (block 630—NO), then process 600 may include determining whether a parent prefix or an associated child prefix corresponds to an output component (block 635). For example, if the stored prefix is a parent prefix, network device 210 may determine whether the parent prefix or an associated child prefix corresponds to an output component 330. In some implementations, network device 210 may determine that the parent prefix does not correspond to an output component 330 because the parent prefix is a nominal prefix being used to organize or group child prefixes more efficiently. Network device 210 may determine that one or more child prefixes, of the set of child prefixes associated with the parent prefix, are associated with one or more output components 330 (e.g., some child prefixes may be mathematically possible but may not correspond to an IP prefix or an output component 330). Additionally, or alternatively, network device 210 may determine that the parent prefix and all child prefixes, of the set of child prefixes, are associated with one or more output components 330.

In some implementations, network device 210 may perform a lookup in memory component 340 to determine whether the parent prefix or a child prefix, of the set of child prefixes, corresponds to an output component (e.g., the same lookup as the lookup performed in connection with block 625 and/or block 630, or a separate lookup).

For example, assume that 10011001 is a stored prefix, and is classified as a parent prefix. Assume further that the parent prefix is associated with child prefixes that are concatenations of the parent prefix and a maximum of up to two additional bits. In this case, the child prefixes may be 10011001 0, 10011001 1, 10011001 00, 10011001 01, 10011001 10, and 10011001 11. Assume that parent prefix 10011001 is based on an IP prefix and associated with a next hop (an output component 330). Assume further that child prefixes 10011001 0 and 10011001 1 are non-nominal and that the rest of the child prefixes are nominal and only mathematically possible. In such an example, network device 210 may determine, by performing a lookup in memory component 340, that the parent prefix 10011001 and child prefixes 10011001 0 and 10011001 1 correspond to one or more output components 330.

As further shown in FIG. 6, if a parent prefix or an associated child prefix corresponds to an output component (block 635—YES), then process 600 may include identifying a longest matching prefix based on the parent prefix and associated child prefixes that correspond to an output component (block 640). For example, network device 210 may identify a longest matching prefix (e.g., a prefix that matches a largest quantity of most significant bits of the destination address of the packet; also, the prefix does not include any bits not included in the destination address) out of the parent prefix and the associated child prefixes that correspond to an output component. In some implementation, network device 210 may identify the longest matching prefix based on performing a lookup in memory component 340 (e.g., the same lookup as the lookup performed in connection with block 625, block 630, and/or block 635, or a separate lookup).

For example, assume that network device 210 has determined, by performing a lookup in memory component 340, that a parent prefix 10011001 corresponds to an output component 330, and child prefixes 10011001 0 and 10011001 1 correspond to other output components 330. Assume, for simplicity, that the destination address associated with the packet is 10011001 0100. In such an example, network device 210 may identify child prefix 10011001 0 as the longest matching prefix.

As further shown in FIG. 6, process 600 may include forwarding the packet to the output component associated with the longest matching prefix (block 645). For example, network device 210 may forward the packet to output component 330 associated with the longest matching prefix (e.g., based on determining which output component 330 is associated with the longest matching prefix). For example, assume that the longest matching prefix is child prefix 10011001 0, which is associated with output component A (an example output component 330). In such an example, network device 210 may output the packet via output component A (e.g., to another network device 210 or another device included in network 220). Additionally, or alternatively, network device 210 may determine which output component 330 is associated with the longest matching prefix based on performing a lookup in memory component 340 (e.g., the same lookup as the lookup performed in connection with block 625, block 630, block 635, and/or 640, or a separate lookup).

As further shown in FIG. 6, if the stored prefix is a terminal prefix (block 630—YES), then process 600 may include forwarding the packet to an output component associated with the terminal prefix (block 650). For example, network device 210 may forward the packet to an output component 330 associated with the terminal prefix (e.g., based on determining which output component 330 is associated with the terminal prefix). In some implementations, network device 210 may forward the packet to output component 330, which may send the packet elsewhere within network 220 (e.g., such as to another network device 210). Additionally, or alternatively, network device 210 may determine which output component 330 is associated with the terminal prefix based on performing a lookup in memory component 340 (e.g., the same lookup as the lookup performed in connection with block 625, block 630, block 635, block 640, and/or 645, or a separate lookup).

As further shown in FIG. 6, if the longest candidate prefix does not match the stored prefix (block 625—NO) or if a parent prefix and associated child prefix(es) do not correspond to an output component (block 635—NO), then process 600 may include removing the longest candidate prefix from the set of candidate prefixes (block 655). For example, network device 210 may remove the longest candidate prefix from the set of candidate prefixes because memory component 340 does not include a stored prefix that matches the longest candidate prefix (e.g., the probabilistic filter may have provided a false positive response and the longest candidate prefix may not actually be a member of the filter set). As another example, network device 210 may remove the longest candidate prefix from the set of candidate prefixes because a parent prefix does not correspond to an output component 330 and neither does a child prefix, of a set of child prefixes associated with the parent prefix, correspond to an output component 330 (e.g., the parent prefix and the set of child prefixes are not IP prefixes that correspond to output components 330).

For example, assume that the set of candidate prefixes includes 63.88.4.168 /24 and 63.88.4.168 /21, and that network device 210 has identified 63.88.4.168 /24 (00111111 01011000 00000100) as the longest candidate prefix. Assume further that network device 210 determines that memory component 340 does not include a stored prefix that matches this longest candidate prefix. In such an example, network device 210 may remove 63.88.4.168 /24 from the set of candidate prefixes.

As further shown in FIG. 6, process 600 may include determining whether there are any candidate prefixes remaining in the set of candidate prefixes (block 660). For example, network device 210 may determine whether there are any candidate prefix remaining in the set of candidate prefixes after removing a longest candidate prefix from the set of candidate prefixes.

As further shown in FIG. 6, if there is a candidate prefix remaining in the set of candidate prefixes (block 660—YES), then process 600 may include returning to block 620 to identify a longest candidate prefix of the set of candidate prefixes. For example, network device 210 may identify a new longest candidate prefix since the old longest candidate prefix has been removed from the set of candidate prefixes, and may continue process 600 using the new longest candidate prefix, as shown in FIG. 6 and as described herein.

Assume, for example, that the set of candidate prefixes originally included 63.88.4.168 /24 and 63.88.4.168 /21, and that network device 210 had identified 63.88.4.168 /24 (00111111 01011000 00000100) as the old longest candidate prefix. Assume further that network device 210 determined that memory component 340 does not include a stored prefix that matches the longest candidate prefix (e.g., the probabilistic filter gave a false positive). In such an example, network device 210 may remove 63.88.4.168 /24 from the set of candidate prefixes, and may select 63.88.4.168 /21 as the new longest candidate prefix.

In some implementations, network device 210 may perform one or more blocks of process 600 (e.g., one or more of blocks 620-665) with a new longest candidate prefix just as network device 210 had performed one or more blocks of process 600 using the old longest candidate prefix. In this way, network device 210 may iteratively select shorter candidate prefixes to be the longest candidate prefix because longer candidate prefixes may have been removed from the set of candidate prefixes in an iterative process, as shown in FIG. 6.

As further shown in FIG. 6, if there are no candidate prefixes remaining in the set of candidate prefixes (block 660—NO), then process 600 may include processing the packet (block 665). For example, network device 210 may process the packet by forwarding the packet using a preconfigured default route when there are no candidate prefixes remaining in the set of candidate prefixes. In some implementations (e.g., if there are no candidate prefixes remaining in the set of candidate prefixes), network device 210 may process the packet by dropping the packet, providing an error notification to a monitoring device associated with a network administrator, or the like.

In this way, network device 210 may use a probabilistic filter and a grouping technique (e.g., to group IP prefixes) to efficiently process packets for forwarding when there are a large quantity of IP prefixes to be stored by network device 210. By using a smaller quantity of IP prefixes in a filter set of the probabilistic filter (e.g., only terminal prefixes and parent prefixes, and not child prefixes), network device 210 may conserve memory (e.g., memory local to input component(s) 310). In this way, a larger quantity of IP prefixes may be used by network device 210 for packet forwarding without increasing the quantity of IP prefixes included in the filter set and with a minimal increase in a quantity of lookups of the memory component.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7E are diagrams of an example implementation 700 relating to example process 600 shown in FIG. 6. FIGS. 7A-7E show an example of forwarding a packet using a probabilistic filter and a grouping technique.

Assume that implementation 700 of FIGS. 7A-7E includes network device 210, which includes input component 310, switching component 320, output component 330, and memory component 340. Assume that network device 210 has identified IP prefixes and output components associated with the IP prefixes. Assume further that network device 210 has classified the IP prefixes as terminal prefixes, parent prefixes, or child prefixes. Assume further that network device 210 has received parameters associated with a probabilistic filter. Assume further that network device 210 has created a probabilistic filter, such as a Bloom filter, based on the parameters, terminal prefix information, and parent prefix information (e.g., as described above in connection with FIGS. 5A and 5B).

Figure 7A:
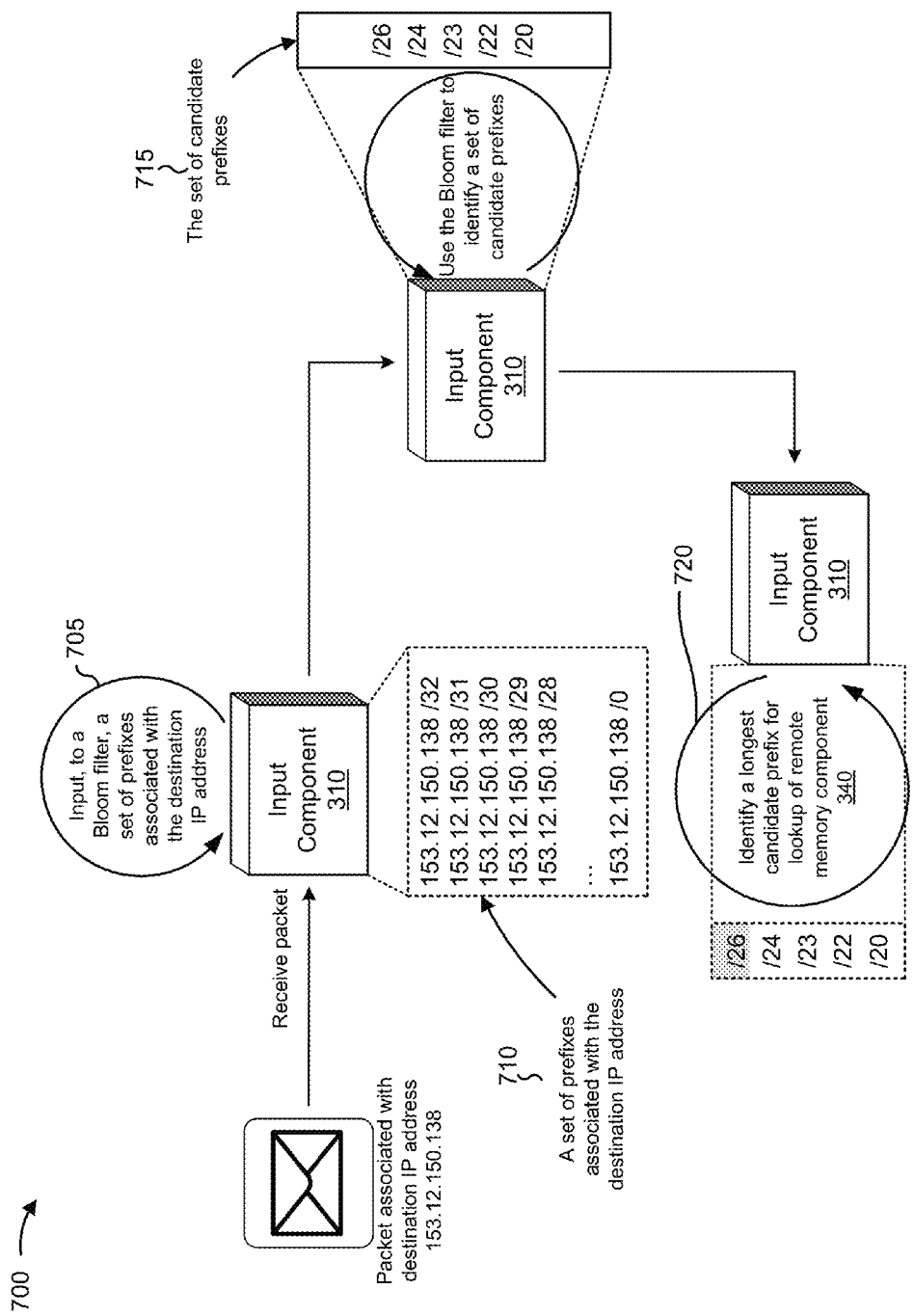
FIGS. 7A-7E are diagrams of an example implementation relating to the example process shown in FIG. 6.

As shown in FIG. 7A, assume that network device 210 receives, via input component 310, a packet associated with a destination IP address of 153.12.150.138. As shown by reference number 705, input component 310 inputs, to a Bloom filter, a set of prefixes associated with the destination IP address. As shown by reference number 710, assume that the set of prefixes associated with the destination IP address includes 153.12.150.138 /32, 153.12.150.138 /31, 153.12.150.138 /30, and so on. As shown by reference number 715, assume that the Bloom filter provides a positive response for prefixes 153.12.150.138 /26, /24, /23, /22, and /20 (e.g., these five prefixes are included in the set of candidate prefixes). As shown by reference number 720, input component 310 identifies a longest candidate prefix, of the set of candidate prefixes, for lookup in memory component 240. In this case, the longest candidate prefix is 153.12.150.138 /26.

Figure 7B:
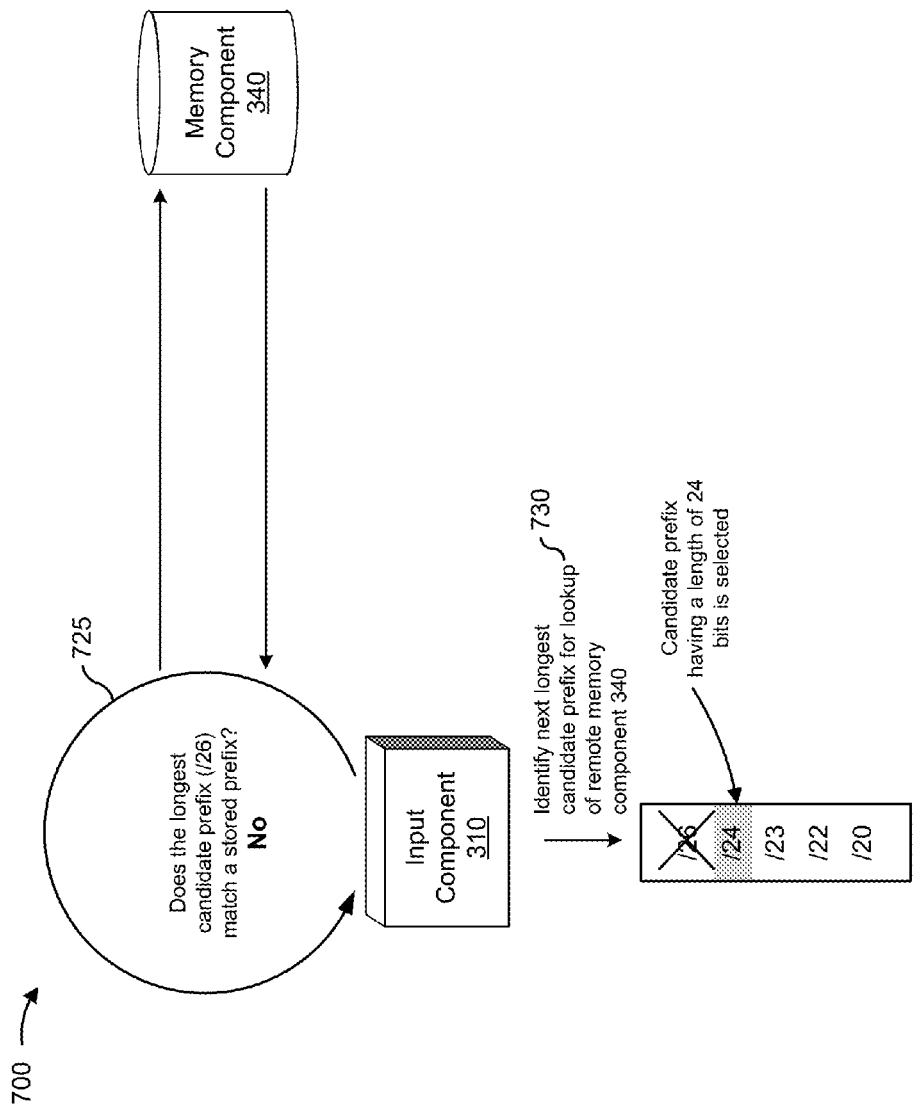

As shown in FIG. 7B, and by reference number 725, input component 310 performs a lookup in memory component 340 to determine whether memory component 340 includes a stored prefix that matches the longest candidate prefix 153.12.150.138 /26. Assume that input component 310 determines that memory component 340 does not include a stored prefix that matches 153.12.150.138 /26 (e.g., the positive response, provided by the Bloom filter in relation to the longest candidate prefix, was a false positive). In this case, and as shown by reference number 730, input component 310 removes 153.12.150.138 /26 from the set of candidate prefixes and selects the next longest prefix, in the set of candidate prefixes, as the longest candidate prefix. In this case, input component 310 selects 153.12.150.138 /24 as the longest candidate prefix.

Figure 7C:
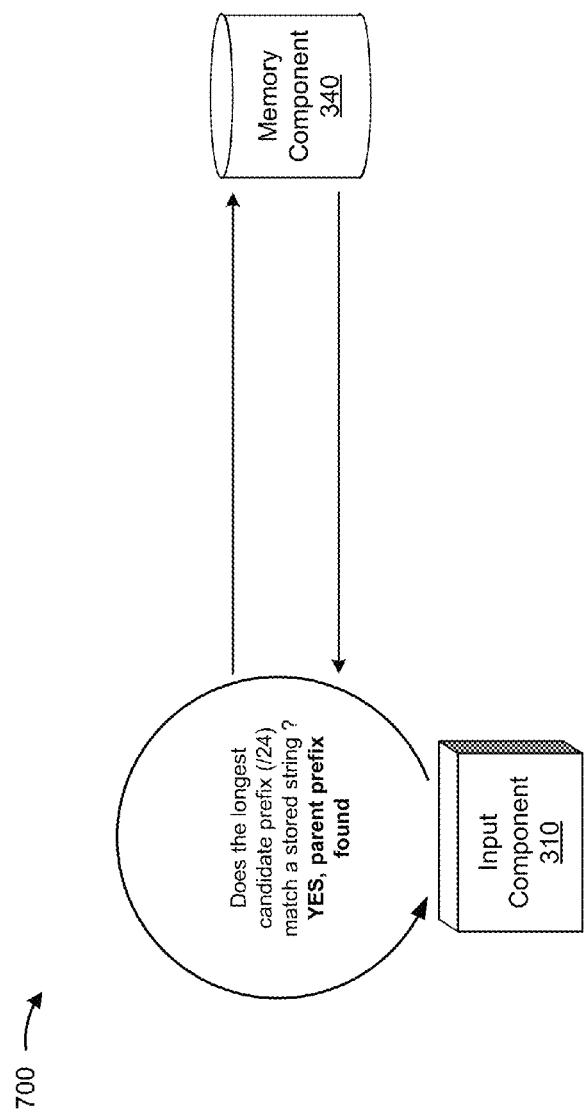

As shown in FIG. 7C, input component 310 performs a lookup in memory component 340 to determine whether memory component 340 includes a stored prefix that matches the new longest matching prefix of 153.12.150.138 /24. As shown, assume that input component 310 determines that memory component 340 includes a stored prefix that matches 153.12.150.138 /24. As further shown, assume that input component 340 determines that the stored prefix is a parent prefix (e.g., based on a parent prefix indicator stored in association with the stored prefix of 153.12.150.138 /24).

Figure 7D:
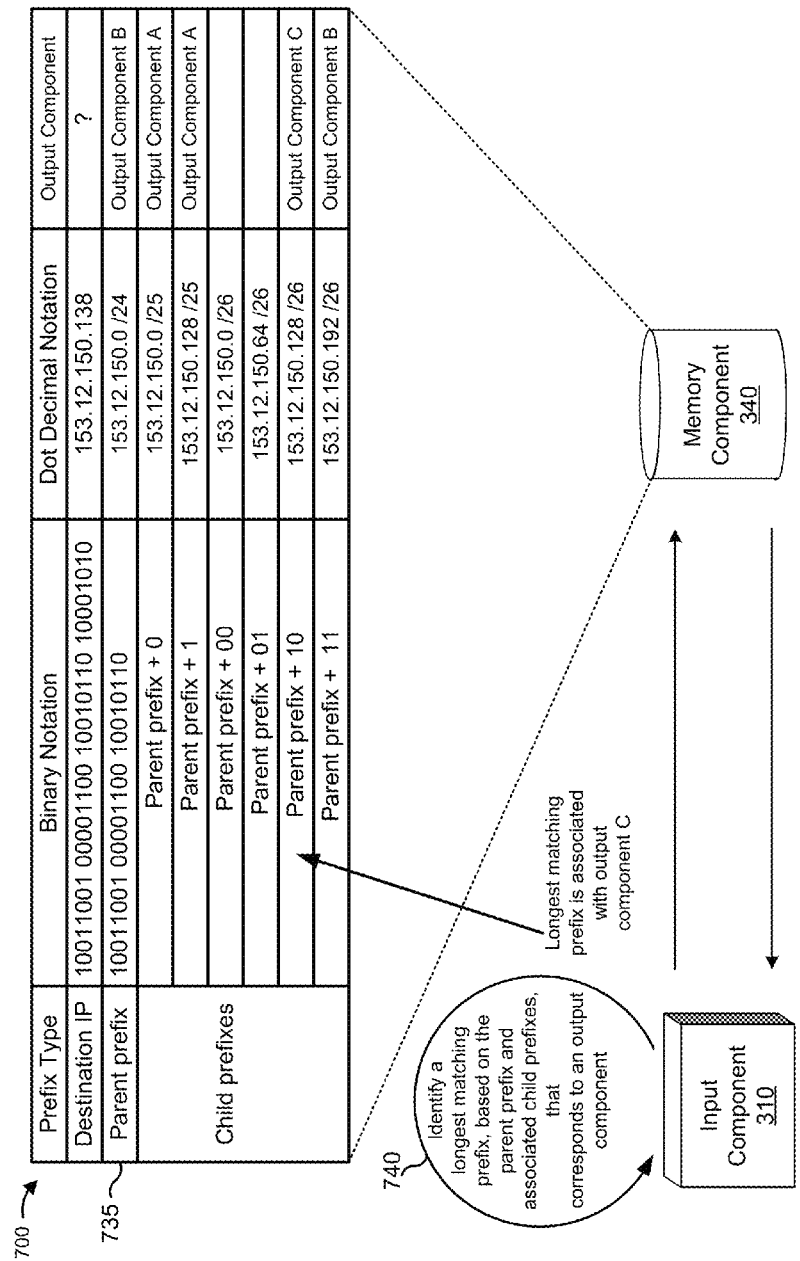

As shown in FIG. 7D, and by reference number 735, assume that the parent prefix 10011001 00001100 10010110 is associated with six child prefixes. As shown, two child prefixes (e.g., a child prefix that is a concatenation of the parent prefix and "00" and a child prefix that is a concatenation of the parent prefix and "01") are not associated with an output component 330. As shown by reference number 740, input component 310 may identify a longest matching prefix, of the parent prefix and associated child prefixes, that corresponds to an output component (e.g., based on performing a lookup in memory component 340). Input component 310 determines that a child prefix that is a concatenation of the parent prefix and "10" is the longest matching prefix (e.g., because 153.12.150.128 /26 has 26 most significant bits in common with the destination IP address, which is more most significant bits in common than the parent prefix or other child prefixes). In addition, input component 310 determines that output component C is associated with the longest matching prefix.

Figure 7E:
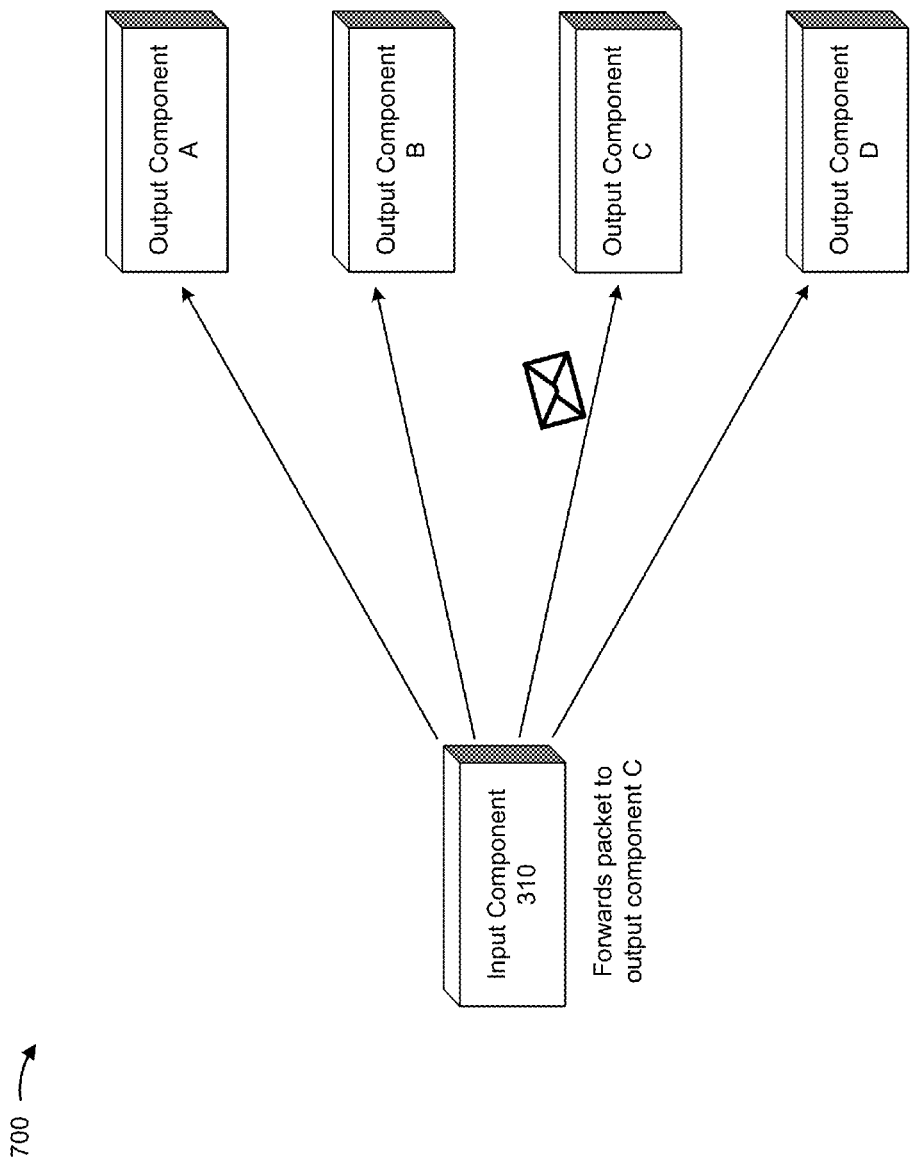

As shown in FIG. 7E, input component 310 forwards the packet, via switching component 320 (not shown), towards output component C. Output component C may forward the packet to another component within network device 210 and/or may forward the packet to another network device 210. In this way, network device 210 may use a probabilistic filter and a grouping technique (e.g., to group IP prefixes) to efficiently process packets for forwarding when there are a large quantity of IP prefixes to be stored by network device 210.

As indicated above, FIGS. 7A-7E are provided merely as an example. Other examples are possible and may differ from what was described with regard to FIGS. 7A-7E.

In this way, a network device may use a probabilistic filter and an IP prefixes grouping technique to route packets more efficiently (e.g., more quickly, using less memory, using less processing power, or the like) than if all IP prefixes had to be included in a filter set of the probabilistic filter. In this way, a larger quantity of IP prefixes may be used by the network device for packet forwarding without increasing the quantity of IP prefixes included in the filter set and with a minimal increase in a quantity of lookups of the memory component.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories to store data; and
   one or more processors to:
      receive IP prefixes and information that identifies output components associated with the IP prefixes;
      classify the IP prefixes into one of three types of prefixes including:
         a terminal IP prefix,
         a parent IP prefix, and
         a child IP prefix,
            a sum of a quantity of a set of terminal IP prefixes and a quantity of a set of parent IP prefixes being below a threshold sum of a capacity of a probabilistic filter,
            terminal prefix information identifying the set of terminal IP prefixes and parent prefix information identifying the set of parent IP prefixes, and
            a quantity of IP prefixes greater than the threshold sum of the capacity of the probabilistic filter being classified as child IP prefixes,
               the child IP prefixes not being stored by the probabilistic filter;
      receive one or more parameters associated with the probabilistic filter,
         the one or more parameters including bit vector size;
      create the probabilistic filter based upon the one or more parameters, the terminal prefix information, and the parent prefix information;
      receive a packet associated with a destination address;
      input, to the probabilistic filter, a set of IP prefixes associated with the destination address,
         an IP prefix, of the set of IP prefixes, including one or more most significant bits of the destination address;
      identify a set of candidate IP prefixes, of the set of IP prefixes, associated with a particular response from the probabilistic filter;
      identify a longest candidate IP prefix of the set of candidate IP prefixes;
      perform a lookup to determine that a memory component includes a parent IP prefix that matches the longest candidate IP prefix,
         the memory component being separate from the probabilistic filter,
         the parent IP prefix being associated with a set of child IP prefixes that include the parent IP prefix and one or more additional bits;
      identify a longest matching IP prefix, of the parent IP prefix and the set of child IP prefixes, that matches one or more most significant bits of the destination address and that corresponds to an output component of the output components; and
      output the packet via the output component.

2. The device of claim 1, where the one or more processors, when identifying the longest matching IP prefix, are further to:
   determine that a child IP prefix, of the set of child IP prefixes, matches a larger quantity of bits of the destination address than the parent IP prefix or other child IP prefixes of the set of child IP prefixes;
   determine that the child IP prefix does not include bits that do not match the destination address; and
   identify the child IP prefix as the longest matching IP prefix based on the child IP prefix matching the larger quantity of bits of the destination address and based on the child IP prefix not including bits that do not match the destination address.

3. The device of claim 1, where the one or more processors, when identifying the longest matching IP prefix, are further to:
   determine that the parent IP prefix matches a larger quantity of most significant bits of the destination address than any child IP prefix of the set of child IP prefixes; and identify the parent IP prefix as the longest matching IP prefix based on determining that the parent IP prefix matches the larger quantity of most significant bits of the destination address.

4. The device of claim 1,
where the device is an input component included in a network device; and
where the memory component is not included in the input component.

5. The device of claim 1, where the probabilistic filter is a Bloom filter.

6. The device of claim 1, where the particular response is:
a positive response when the probabilistic filter determines that the IP prefix is possibly a member of a filter set, or
a negative response when the probabilistic filter determines that the IP prefix is definitely not a member of the filter set,
the filter set including the parent IP prefix.

7. A non-transitory computer-readable medium storing instructions, the instructions comprising:
one or more instructions that, when executed by one or more processors, cause the one or more processors to:
receive IP prefixes and information that identifies output components associated with the IP prefixes;
classify the IP prefixes into one of three types of prefixes including:
a terminal IP prefix,
a parent IP prefix, and
a child IP prefix,
a sum of a quantity of a set of terminal IP prefixes and a quantity of a set of parent IP prefixes being below a threshold sum of a capacity of a probabilistic filter,
terminal prefix information identifying the set of terminal IP prefixes and parent prefix information identifying the set of parent IP prefixes, and
a quantity of IP prefixes greater than the threshold sum of the capacity of the probabilistic filter being classified as child IP prefixes,
the child IP prefixes not being stored by the probabilistic filter;
receive one or more parameters associated with the probabilistic filter,
the one or more parameters including bit vector size;
create the probabilistic filter based upon the one or more parameters, the terminal prefix information, and the parent prefix information;
receive a packet associated with a destination address;
input, to the probabilistic filter, a set of IP prefixes associated with the destination address,
an IP prefix, of the set of IP prefixes, including one or more most significant bits of the destination address;
identify, using the probabilistic filter, a set of candidate IP prefixes of the destination address;
identify a longest candidate IP prefix of the set of candidate IP prefixes;
determine whether a memory component includes a stored IP prefix that matches the longest candidate IP prefix,
the memory component being separate from the probabilistic filter,
the stored IP prefix being a parent IP prefix, of the set of parent IP prefixes, or a terminal IP prefix of the set of terminal IP prefixes,
the parent IP prefix being associated with a set of child IP prefixes that include the parent IP prefix and one or more additional bits,
the terminal IP prefix not being associated with any child IP prefixes; and
selectively perform a first action or a second action based on determining whether the memory component includes the stored IP prefix that matches the longest candidate IP prefix,
the first action including removing the longest candidate IP prefix from the set of candidate IP prefixes when the memory component does not include the stored IP prefix,
the second action including forwarding the packet to an output component of the output components associated with the stored IP prefix when the memory component includes the stored IP prefix.

8. The non-transitory computer-readable medium of claim 7, where the one or more instructions, when executed by the one or more processors, further cause the one or more processors to:
determine that one or more candidate IP prefixes remain in the set of candidate IP prefixes after removal of the longest candidate IP prefix; and
select a new longest candidate IP prefix, of the one or more candidate IP prefixes remaining in the set of candidate IP prefixes after removal of the longest candidate IP prefix, to determine whether the memory component includes a stored IP prefix that matches the new longest candidate IP prefix.

9. The non-transitory computer-readable medium of claim 7, where the destination address is:
an internet protocol version four, or greater, address.

10. The non-transitory computer-readable medium of claim 7, where the output component is a first output component and where the one or more instructions, when executed by the one or more processors, further cause the one or more processors to:
forward the packet to a second output component associated with the terminal IP prefix when the memory component includes the stored IP prefix and when the stored IP prefix is the terminal IP prefix.

11. The non-transitory computer-readable medium of claim 7, where the probabilistic filter is a Bloom filter associated with one or more hash functions.

12. The non-transitory computer-readable medium of claim 7, where the one or more instructions, that cause the one or more processors to identify the set of candidate IP prefixes, further cause the one or more processors to:
identify the set of candidate IP prefixes based on a particular response from the probabilistic filter.

13. A method, comprising:
receiving, by a device, IP prefixes and information that identifies output components associated with the IP prefixes;
classifying, by the device, the IP prefixes into one of three types of prefixes including:
a terminal IP prefix,
a parent IP prefix, and
a child IP prefix,
a sum of a quantity of a set of terminal IP prefixes and a quantity of a set of parent IP prefixes being below a threshold sum of a capacity of a probabilistic filter,
terminal prefix information identifying the set of terminal IP prefixes and parent prefix information identifying the set of parent IP prefixes, and a quantity of IP prefixes greater than the threshold sum of the capacity of the probabilistic filter being classified as child IP prefixes,
the child IP prefixes not being stored by the probabilistic filter;
receiving, by the device, one or more parameters associated with ache probabilistic filter,
the one or more parameters including bit vector size;
creating, by the device, the probabilistic filter based upon the one or more parameters, the terminal prefix information, and the parent prefix information;
receiving, by the device, a packet associated with a destination address;
inputting, by the device and to the probabilistic filter, a set of IP prefixes,
an IP prefix, of the set of IP prefixes, including one or more bits of the destination address;
identifying, by the device, a set of candidate IP prefixes, of the set of IP prefixes, associated with a particular response from the probabilistic filter;
identifying, by the device, a longest candidate IP prefix of the set of candidate IP prefixes;
performing, by the device, a lookup to determine that a memory component includes a parent IP prefix that matches the longest candidate IP prefix,
the memory component being separate from the probabilistic filter,
the parent IP prefix being associated with a set of child IP prefixes that include the parent IP prefix and one or more additional bits;
identifying, by the device, a longest matching IP prefix, of the parent IP prefix and the set of child IP prefixes, that is associated with the destination address and that corresponds to an output component of the output components; and
outputting, by the device, the packet via the output component.

14. The method of claim 13, where identifying the longest matching IP prefix further comprises:
determining that a child IP prefix, of the set of child IP prefixes, does not include any bits that do not match the bits of the destination address;
determining that the child IP prefix matches a larger quantity of the bits of the destination address than the parent IP prefix or other child IP prefixes of the set of child IP prefixes; and
identifying the child IP prefix as the longest matching IP prefix based on determining that the child IP prefix matches the larger quantity of the bits of the destination address.

15. The method of claim 13, where identifying the longest matching IP prefix further comprises:
determining that the parent IP prefix matches a larger quantity of the bits of the destination address than the set of child IP prefixes; and
identifying the parent IP prefix as the longest matching IP prefix based on determining that the parent IP prefix matches the larger quantity of the bits of the destination address.

16. The method of claim 13, where the destination address is an internet protocol version four, or greater, address.

17. The method of claim 13,
where the device is an input component included in a network device; and
where the memory component is not included in the input component.

18. The device of claim 1, where the terminal prefix information and the parent prefix information is stored in the probabilistic filter.

19. The non-transitory computer-readable medium of claim 7, where the terminal prefix information and the parent prefix information is stored in the probabilistic filter.

20. The method of claim 13, where the terminal prefix information and the parent prefix information is stored in the probabilistic filter.

* * * * *